(12) United States Patent
Damkjær

(10) Patent No.: US 6,186,771 B1
(45) Date of Patent: Feb. 13, 2001

(54) INJECTION MOULDING MACHINE

(75) Inventor: Poul Erik Damkjær, Vejle Øst (DK)

(73) Assignee: Engel Maschinenbau Gesellschaft mbH, Schwertberg (AT)

(*) Notice: Under 35 U.S.C. 154(b), the term of this patent shall be extended for 0 days.

(21) Appl. No.: 09/117,849

(22) PCT Filed: Feb. 7, 1997

(86) PCT No.: PCT/DK97/00050

§ 371 Date: Aug. 6, 1998

§ 102(e) Date: Aug. 6, 1998

(87) PCT Pub. No.: WO97/28946

PCT Pub. Date: Aug. 14, 1997

(30) Foreign Application Priority Data

Feb. 9, 1996 (DK) .................................................. 9600050

(51) Int. Cl.$^7$ .................................................. B29C 45/64
(52) U.S. Cl. ..................... 425/595; 100/231; 100/258 A; 425/451.9
(58) Field of Search ................... 425/595, 451.9; 100/231, 258 A

(56) References Cited

U.S. PATENT DOCUMENTS

| | | |
|---|---|---|
| 2,266,129 | 12/1941 | Tagarty . |
| 5,354,196 | 10/1994 | Ziv-Av .................................. 425/589 |
| 5,538,415 | 7/1996 | Reinhart et al. ...................... 425/589 |
| 5,556,656 | 9/1996 | Lampl et al. ........................ 425/589 |
| 5,633,024 * | 5/1997 | Ziv-Av .................................. 425/595 |
| 5,650,182 | 7/1997 | Füller et al. .......................... 425/589 |
| 5,783,231 * | 7/1998 | Fuller et al. .......................... 425/595 |
| 5,811,141 | 9/1998 | Pickel et al. ......................... 425/589 |
| 5,888,560 | 3/1999 | Naderhirn ............................. 425/589 |
| 5,891,488 * | 4/1999 | Witsttock et al. ................. 425/451.9 |

FOREIGN PATENT DOCUMENTS

| | | |
|---|---|---|
| 9421299 | 8/1995 | (DE) . |
| 4420639 | 9/1995 | (DE) . |
| 9707961 | 3/1997 | (WO) . |

* cited by examiner

*Primary Examiner*—James P. Mackey
(74) *Attorney, Agent, or Firm*—Antonelli, Terry, Stout & Kraus, LLP

(57) ABSTRACT

Injection molding machine (1) comprising a machine frame (2) with a stationary plane (5) and a movable plane (6) for the mounting of mold parts (7, 8), and where the movable plane (6) is connected to a conveying mechanism (10, 10') which exerts the pressure necessary to close the mold parts and keep these closed during the injection phase. The machine further comprises a mounting plane (9) for the conveying mechanism. The mounting plane (9) and the stationary plane (5) are provided with tie rods (17), expansion elements or similar devices, and at least one of the planes (5, 9) is mounted or suspended in at least one elastic machine part (30, 30') arranged in the plane's opposite side in relation to the fastening to the planes of the tie rods (17), the expansion elements or similar devices.

27 Claims, 3 Drawing Sheets

INJECTION MOULDING MACHINE

BACKGROUND OF THE INVENTION

1. Field of the Invention

The invention relates to an injection moulding machine as described in the preamble to claim 1. The invention relates in particular to injection moulding machines with very high closing pressures.

Description of the Prior Art

Injection moulding machines of this kind are known from the applicant's own earlier International Patent Application no. PCT/DK95/00339. With the configuration disclosed herein, it is possible to maintain a large, open, freely accessible area between the planes in the same manner as is known from machines without tie rods, and still maintain full parallelism between the planes at very high closing pressures, which is very difficult with machines without tie rods. This is achieved without using complicated mechanisms and thus without increasing the costs of the machine to any significant degree. The possibility of adjustment which enables the planes to remain parallel, even at high closing pressures, is achieved by means of tie rods or the like between a mounting plane and the stationary plane, and with at least one swivel joint in the plane's opposite side in relation to that to which the tie rods are secured. These auxiliary tie rods are disposed in such a manner that they do not hinder access to the area between the planes. The pivot links are, for example, rounded projections or the like which rest against a rounded surface.

A similar construction is known from German Utility Model Publication No. 9421299, but wherein bearings are used where the planes and the tie bars are coupled together. This has several disadvantages, among these being that the bearings get worn by the high pressures and, moreover, have to be adjusted and lubricated, which is very difficult because of the effects of the great pressure.

SUMMARY OF THE INVENTION

A desired function and parallelism is achieved between the halves of the mould completely without any mechanically moving parts, in that the possible turning of the planes is achieved by the resilience of the elastic machine part.

In the present description, an elastic machine part is to be understood to be a joint-like element without mutually moving parts, i.e. the movement arises solely as a consequence of the machine part's own resilience or possible elastic deformation.

The machine part according to the invention can withstand even very high pressures without any deformation in the direction of pressure.

The machine part itself can be configured either as an independent unit or as an integrated unit, where the part is integrated with one of the parts which serve to effect the actual coupling together. Both configurations offer advantages of a practical nature as well as from the point of view of production technique, depending among other things on the construction etc. of the rest of the injection moulding machine.

The injection moulding machine according to the invention achieves a uniform construction at both sides of the machine, which among other things makes the preceding calculation and construction work more simple.

An elastic machine has a desired resilience or elasticity and at the same time the possibility is provided of being able to provide securing elements, e.g. threaded holes, in the areas which are not deformed.

The part is hereby configured as an independent unit which has a practical shape and is simple to produce. It is possible for its configuration to be symmetrical, so that it does not need to be turned in a certain way when being mounted.

The invention also relates to a specially-configured injection moulding machine with optimized characteristics, having a so-called C-frame self-supporting machine frame as disclosed in claim 9. With the combination of such an injection moulding machine frame configured with tie bars at the bottom of the planes as described above, and an elastic machine part similarly as described above, as far as the parts which must maintain the parallelism between the two halves of the moulding tool are concerned, the resulting injection moulding machine is one without mechanical parts which move in relation to one another during the moulding process. In such a machine according to the invention, the relevant parts, i.e. the C-frame, the tie bars between the planes and the elastic machine part(s), will all be elastic and will yield slightly due to the injection pressure. The individual parts can be dimensioned in such a manner that the elastic expansions, the outward bending etc., completely compensate for each other, and the two halves of the mould remain parallel, even at very high injection pressures. Since the parts do not move mechanically but only elastically in relation to each other, there are no bearings or the like which need to be lubricated or maintained in any way, which is a very great advantage.

BRIEF DESCRIPTION OF THE DRAWINGS

The invention will now be described in more detail with reference to the drawings, in that FIG. 1 shows an injection moulding machine with an elastic machine part according to the invention.

DESCRIPTION OF THE PREFERRED EMBODIMENT

Figure 1A:
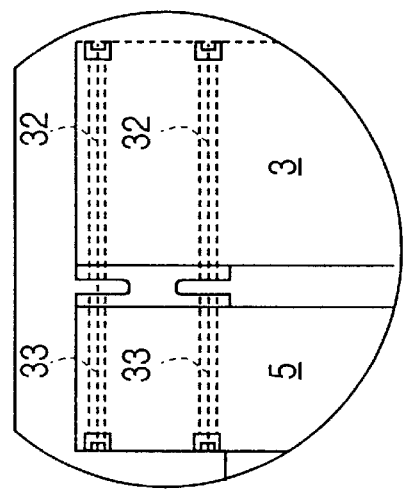
FIG. 1*a* shows on a larger scale a detail in FIG. 1 regarding the elastic machine part.
Figure 1:
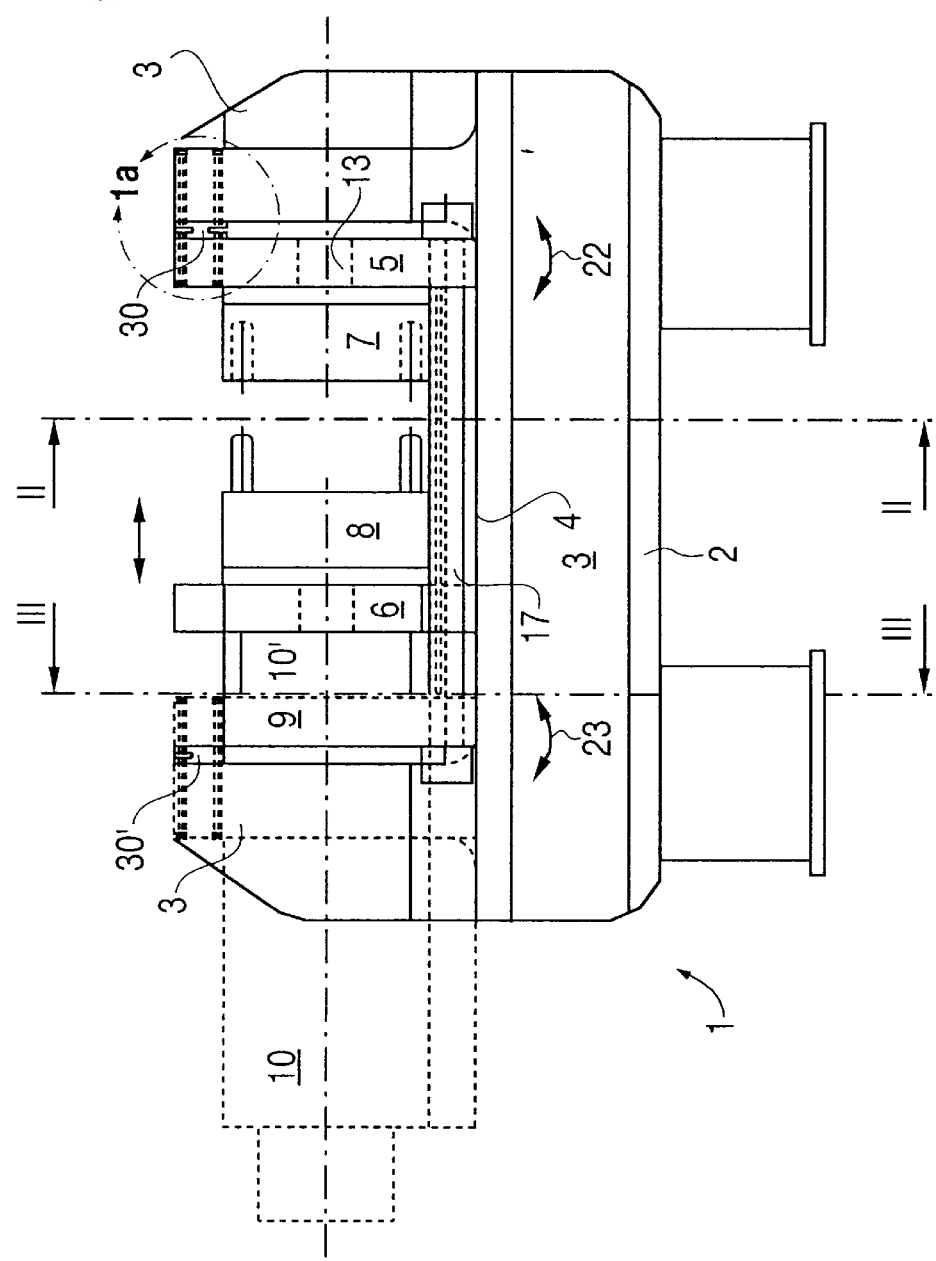
Figure 2:
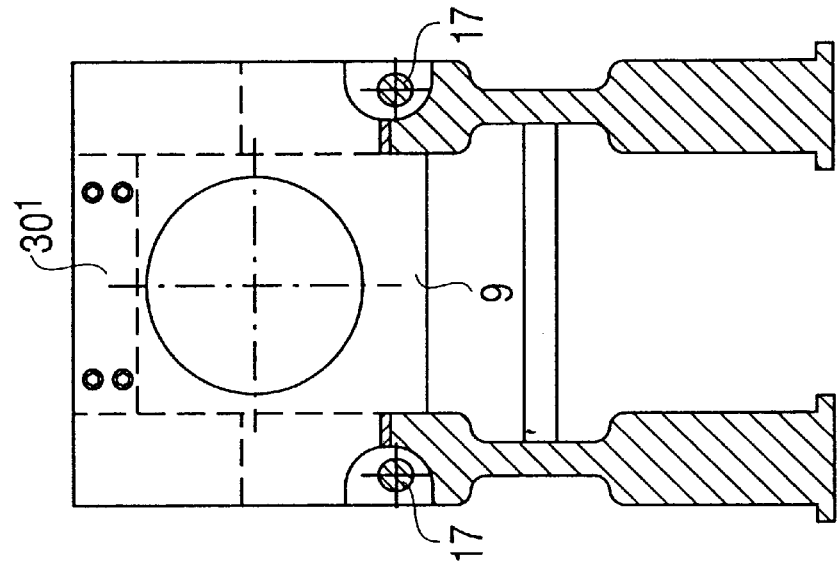
FIG. 2 shows a plane section in the direction II—II in FIG. 1.
Figure 3:
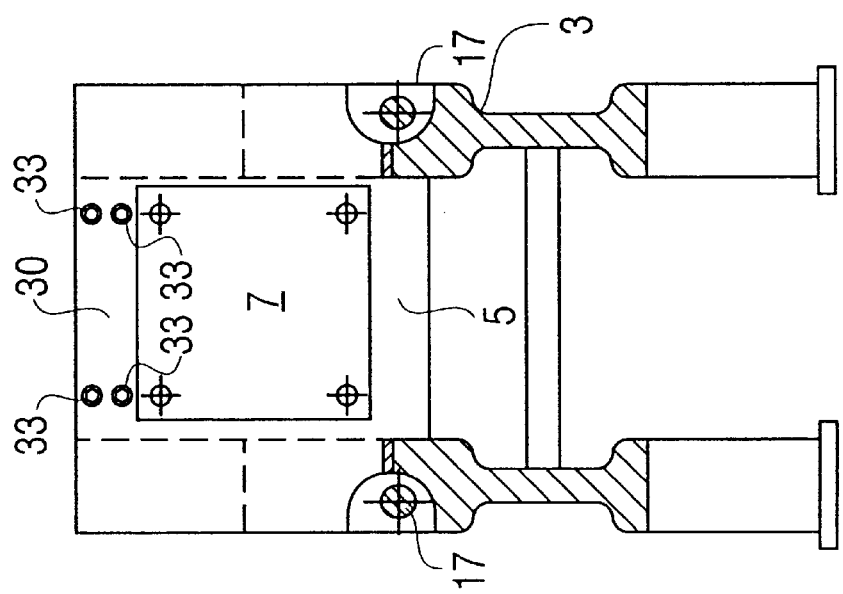
FIG. 3 shows a plane section in the direction III—III in FIG. 1.

FIGS. 1–3 show a fully-hydraulic injection molding machine 1 comprising a machine frame 2 with a so-called C-frame 3 which carries and supports the two planes 5, 6 on which the mold parts 7, 8 for an injection mold are secured. The plane 5 with the mold part 7 is stationary during the actual molding cycle, and is suspended at the top in an elastic machine part 30 which will be explained in more detail later. During the molding cycle, which starts when the mold parts are closed, the mold material is introduced into the mould through a central opening 13. The part of the machine which effects the actual heating and melting of the molding material, the introduction hereof under pressure etc., is not shown in the drawing and will not be explained in the present application, in that the technique used here is commonly known.

The second plane 6 is movable, in that it is supported in a known manner by one or more slide planes 4 provided on the machine frame. Behind the movable plane is provided a stationary mounting plane 9 for the mounting of the conveying device in the form of a large, hydraulic cylinder 10 with a piston 10', which is secured to the movable plane 6. In a manner corresponding to that of the stationary plane 5, the mounting plane 9 is suspended at the top by means of an elastic machine part 30' in the C-frame of the machine.

At the foot of the planes 5, 9, i.e. at that side of the planes which faces down towards the machine frame and the slide planes 4, two tie rods 17 are provided, one on each side, said tie rods being in firm but adjustable engagement with the planes 5 and 9. The tie rods 17 can pass the plane 6 through an opening for each tie rod in such a manner that the movement of the plane is not restricted or prevented.

Although the conveying mechanism in the present case is a hydraulic cylinder 10, other conveying mechanisms will be able to be used, e.g. knee-joint mechanisms and the like.

The injection molding machine described above corresponds essentially to that which is described in the applicant's earlier International Patent Application no. PCT/DK95/00339, except for the configuration of the elastic machine part 30, 30'. This part makes it possible for the planes 5, 9 to move in the directions shown by the arrows 22, 23. Together with the tie rods 17, the part 30, 30' serves to ensure that the planes 5, 9 remain completely parallel, the result being that the mould parts 7, 8 do not open during the moulding cycle, regardless of the degree of pressure used.

Figure 4:
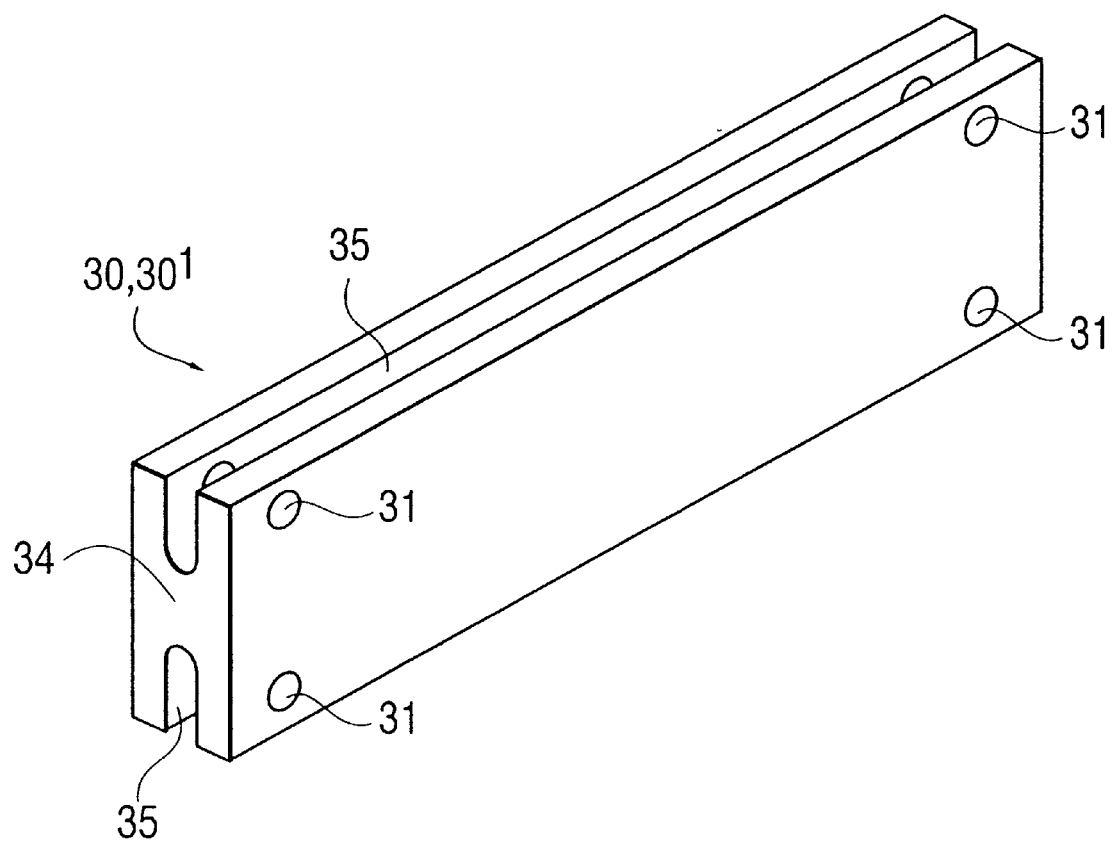
FIG. 4 shows an example of an elastic machine part according to the invention configured as an independent unit and on the same scale as in FIG. 1*a*.

The novel aspect according to the invention lies in the configuration of the elastic machine part 30, 30', which can for example be configured as shown in the drawing, i.e. with the part as an independent unit as shown in FIG. 4. However, it will be obvious to a person skilled in the art that the elastic machine part will be able to have many other configurations, and will also be able to be configured as a one-piece unit with, e.g. the planes 5, 9, on which they are arranged to be secured.

The elastic machine part 30, 30' is made of steel, e.g. as a rectangular rail as shown in FIG. 4, with a central part 34 which is solid, and a longitudinal groove 35 in each side with threaded holes 31 for securing by means of bolts 32, 33, e.g. countersunk bolts as shown in FIG. 1a. The part 30, 30' must have such a configuration and be of a material, e.g. steel, so that from the strength point of view it is strong enough to withstand the high tensile forces which arise, but at the same time be able to yield slightly if the planes 5, 9 move as shown by the arrows 22, 23. FIG. 4 shows an example of a usable configuration.

It will be obvious to a person skilled in the art that although the elastic machine part 30, 30' is configured as an independent unit, the central part 34 will be able to be configured with openings or grooves other than those which are shown in order to increase the possibilities of the part's movement. With the embodiment shown, the movement arises solely as a consequence of the part's own resilience in the form of elastic deformation, without the occurrence of any compression of the part.

What is claimed is:

1. An injection molding machine comprising:
   a machine frame having a stationary plane and a movable plane for the mounting of mold parts with the movable plane being connected to a conveying mechanism which exerts pressure for closing and holding mold parts closed during an injection phase, a mounting plane holding the conveying mechanism, with the mounting plane and the stationary plane being fixed on one side with at least one tie rod and at least one of the stationary plane and the mounting plane on an opposite side being connected to the machine frame with an elastic element.

2. An injection molding machine according to claim 1 wherein:
   the elastic element is a solid part.

3. An injection molding machine according to claim 1 wherein:
   the elastic element includes securing elements which connect the elastic element to at least one of the stationary and mounting plane and machine frame.

4. An injection molding machine according to claim 2 wherein:
   the elastic element includes securing elements which connect the elastic element to at least one of the stationary and mounting plane and machine frame.

5. An injection molding machine according to claim 1, wherein:
   the elastic element is an integral part of at least one of the stationary and mounting planes.

6. An injection molding machine according to claim 2, wherein:
   the elastic element is an integral part of at least one of the stationary and mounting planes.

7. An injection molding machine according to claim 1, wherein:
   the stationary and mounting planes are each mounted on the machine frame and connected to a pair of elastic elements.

8. An injection molding machine according to claim 2, wherein:
   the stationary and mounting planes are each mounted on the machine frame and connected to a pair of elastic elements.

9. An injection molding machine according to claim 3, wherein:
   the stationary and mounting planes are each mounted on the machine frame and connected to a pair of elastic elements.

10. An injection molding machine according to claim 4, wherein:
    the stationary and mounting planes are each mounted on the machine frame and connected to a pair of elastic elements.

11. An injection molding machine according to claim 5, wherein:
    the stationary and mounting planes are each mounted on the machine frame and connected to a pair of elastic elements.

12. An injection molding machine according to claim 6, wherein:
    the stationary and mounting planes are each mounted on the machine frame and connected to a pair of elastic elements.

13. An injection molding machine according to claim 1, wherein:
    the elastic element contains at least one groove.

14. An injection molding machine according to claim 2, wherein:
    the elastic element contains at least one groove.

15. An injection molding machine according to claim 3, wherein:
    the elastic element contains at least one groove.

16. An injection molding machine according to claim 4, wherein:
    the elastic element contains at least one groove.

17. An injection molding machine according to claim 5, wherein:

the elastic element contains at least one groove.

18. An injection molding machine according to claim 6, wherein:

the elastic element contains at least one groove.

19. An injection molding machine according to claim 7, wherein:

the elastic element contains at least one groove.

20. An injection molding machine according to claim 8, wherein:

the elastic element contains at least one groove.

21. An injection molding machine according to claim 9, wherein:

the elastic element contains at least one groove.

22. An injection molding machine according to claim 10, wherein:

the elastic element contains at least one groove.

23. An injection molding machine according to claim 11, wherein:

the elastic element contains at least one groove.

24. An injection molding machine according to claim 12, wherein:

the elastic element contains at least one groove.

25. An injection molding machine according to claim 2, wherein:

a central part of the elastic element is solid.

26. An injection molding machine according to claim 2, wherein:

the elastic element is a metal rail secured transversely to a top of the stationary and mounting planes and the metal rail has at least one longitudinally extending transverse groove.

27. An injection molding machine comprising:

a machine frame with a stationary plane and a movable plane for the mounting of mold parts with the movable plane being connected to a conveying mechanism which exerts closing pressure on the mold parts and a mounting plane which holds the conveying mechanism, wherein:

a) the machine frame is C-shaped;

b) at least one tie rod fixes the stationary and mounting planes on one side thereof; and c) at least one elastic element is disposed on another side of the stationary and mounting planes opposite the at least one tie rod for connecting at least one of the stationary and mounting planes to the machine frame.

* * * * *